July 23, 1957
J. JARRET ET AL
2,800,321
RUBBER INCLUDING SPRING DEVICE
Filed Dec. 2, 1952
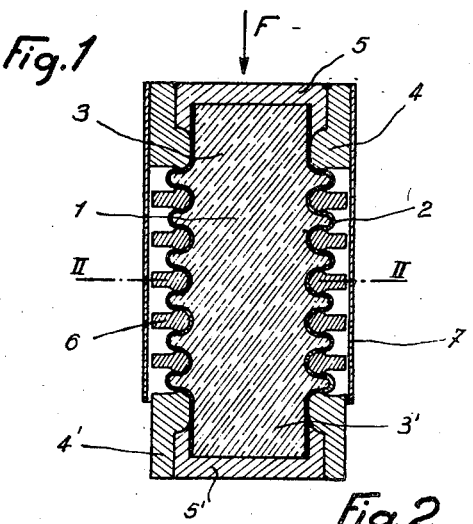
Fig.1
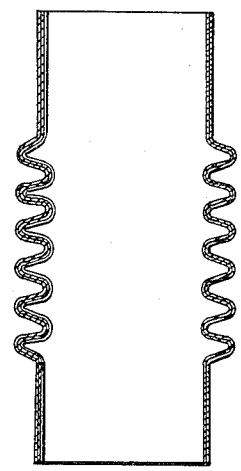
FIG.7
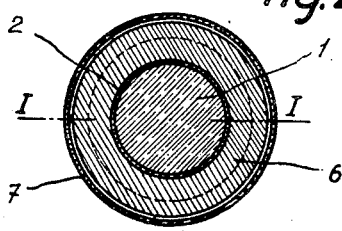
Fig.2
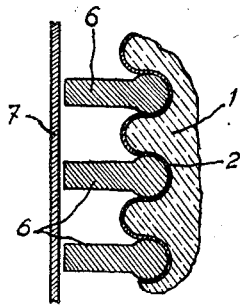
Fig.3
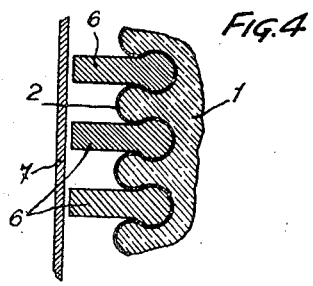
Fig.4
Fig.8
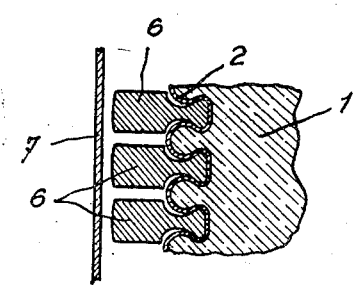
FIG.5
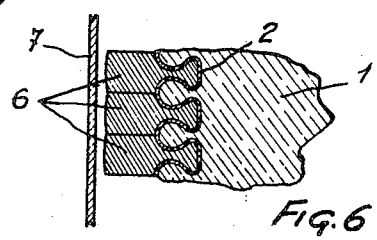
Fig.6
INVENTORS:
JEAN JARRET
JACQUES JARRET
BY: *Hans Meister*
AGENT

United States Patent Office 2,800,321
Patented July 23, 1957

2,800,321

RUBBER INCLUDING SPRING DEVICE

Jean Jarret, Courbevoie, and Jacques Jarret, Lyon, France

Application December 2, 1952, Serial No. 323,587

Claims priority, application France December 6, 1951

11 Claims. (Cl. 267—63)

Under the name of rubber, by which is meant synthetic or artificial rubber, as well as India rubber or caoutchouc, solid bodies are designated which are capable of being subjected without rupture to non-permanent deformations that are more severe or more numerous than those to which other solid bodies may be subjected. The apparent Young's modulus of rubber (that is to say the ratio of the force per unit area acting on it, or stress, to the linear deformation per unit length, or strain, which it causes in the direction in which it acts) is small with respect to that of other solids.

The apparent Young's modulus of a test piece of rubber is particularly small because the deformations which are imparted to the test piece appear as modifications of shape but do not cause sensible modifications of volume. If, on the contrary, the test piece is combined with such a device that the modifications of shape are compulsorily accompanied with a diminution of volume, the constraints necessary to attain that end are rather considerable and of the same order of magnitude as those which must be applied to liquids for obtaining identical diminutions of volume. Of course, this is no longer true for rubber in which is included a gas, the latter being capable of being compressed under relatively small pressures.

The viscosity rubber however, that is to say the resistance opposing the relative displacement of the molecules, is very high: from a thousand to a hundred thousand times that of liquids.

The property of rubber which permits the shape to be altered while having a small apparent Young's modulus and a high viscosity has permitted it to be used for the manufacture of springs in very varied manners.

However, if it is desired to give to ordinary rubber springs a large damping resistance, one has to subject the rubber to considerable deformations which result in permanent deformations. As a matter of fact, if constraints causing deformations of large amplitude are applied to a rubber test piece, a flow of molecules begins, the result being a permanent deformation. If the deformations given to the test piece are reduced, so that no permanent deformation takes place, the relative displacement of the molecules is slight and consequently there is little resistance for absorbing shocks.

According to the present invention, the rubber is used under such conditions that the constraints to which it is subjected have for effect on the one hand to diminish its volume, on the other hand to impart to it such deformations that the molecules are compelled to move with respect to each other so that, when the constraint ends, the return of the rubber to its initial condition necessitates a new relative displacement of the molecules which the viscosity tends to oppose and which provides therefore a powerful shock absorption.

It must be understood, however, that, in the above definition, the word rubber designates any high polymer the volume of which can be reduced by 10% under a pressure equal or less than 10,000 kg./cm.$^2$ and the viscosity of which is greater than 100 poises.

A spring based on this principle may be constituted by a block of rubber closely housed in a casing the material of which has a mechanical strength which is preferably much higher than that of the enclosed rubber (for example stainless steel sheet), so shaped that it can be subjected to deformations causing a diminution of its internal volume without permanent deformation.

The conformation of the casing will be such, besides, that it alters its shape in a non-uniform manner, so that the rubber molecules being situated in the region where the capacity is reduced, are driven towards the portions of the casing which have preserved their normal capacity.

The rubber which fills the deformable casing will be preferably, but non exclusively, a vulcanised rubber, agglomerated or not with active or inert fillings containing or not a gaseous product. If it is desired that the arrangement should dissipate a considerable amount of energy (which would be due to the utilization to its greatest extent of its shock absorbing properties) a rubber which is not affected perceptibly by heat, for example silicone rubber, will be used preferably. If it is desired that the resilient reaction of the spring be small, without reducing its dimensions too much, a rubber containing a gaseous product will be preferably employed.

The accompanying drawing shows, in the way of example, a particular embodiment of the invention.

Fig. 1 shows a vertical section of the spring in its normal position,

Fig. 2 is a section of it along II—II of Fig. 1,

Figs. 3 and 4 are partial vertical sections, on a larger scale, of the spring in its normal position and in its compressed position, respectively, Figs. 5 and 6 are analogous sections of an alternative embodiment, Fig. 7 is an axial section illustrative of a plural-wall modification of the single-wall rubber-confining casing of Fig. 1 or 5, Fig. 8 is an end view of the tube of Fig. 7.

The arrangement shown is essentially constituted by a mass 1 of rubber closely enclosed in a casing capable of being deformed owing to its height being decreased through the action of a vertical force F.

The casing is constituted by a tube 2 of stainless steel sheet 1, having circular corrugations over the greatest part of its length, and terminated at each end by an undeformable cylindrical part 3 or 3' surrounded to this end by a rigid cylindrical sleeve 4 or 4'. The two ends of this casing are closed by metallic plugs 5—5' which will receive the forces F applied to the spring. The casing is completely filled with vulcanised rubber. In order to guide the deformations caused by these forces and to avoid permanent deformations, there is preferably arranged, in the grooves formed externally by the corrugations, hoops 6 of steel of high strength. The whole of the spring is enclosed in a cylindrical tube 7 solid with one of the plugs 5 and adapted to slide on the sleeve 4' of the opposite end, which will prevent buckling of the device and will protect the casing.

According to an alternative embodiment, the hoops are so shaped that in the position of contact they define the surface of corrugations in the position of maximum compression (Figs. 5 and 6).

The casing will tend to alter its shape under the action of the forces F (Figs. 4 and 6) by decreasing the internal capacity of its middle portion. There results a corresponding resilient decrease of the volume of the mass of rubber in the corresponding middle portion. The rubber will therefore tend to flow from this middle portion towards the rigid extremities with considerable internal frictions.

When the forces cease to act, the casing will tend to reusme its normal shape (Figs. 3 and 5) and the rubber will tend to expand to fill the capacity offered to it. This tendency will however be opposed by the internal frictions resulting from the reverse flow (from the extremities towards the middle portion) so that the return to the normal position will be powerfully damped.

The spring which has just been described may be obtained in the following manner:

Starting from a cylindrical tube which is filled with a cylinder of raw or slightly vulcanised rubber, it has been observed that it is advantageous to constitute this tube from a sheet of thin sheet iron coiled so as to form several layers, the dimension of which will be either equal to the height of the tube and the other dimension equal to the circumference of the tube multiplied by the number of the layers it is desired to obtain as, for example, illustrated in Figs. 7 and 8, or less than this height and wound spiral-fashion with such a pitch that the desired number of layers is obtained.

In Figs. 7 and 8, particularly, it should be noted, the wall thickness is exaggerated, in aid of clarity of the drawing.

This arrangement in which the wall of the casing is formed of several superposed layers of metal, permits resilient deformations of the corrugations which are much more considerable than if there was a single layer of metal having the same total thickness. As a matter of fact, the variations of the radii of curvature of the ring elements of the corrugations are all the more greater where the thickness of each layer is less; when resilient deformations take place, the layers of metal will slide one above the other in the fashion of the strips of a helical spring.

Besides, the cost of stainless steel sheet is much less than the cost of the corresponding cylindrical tube.

The cylindrical tube, one end of which is closed, is then placed in a mould having corrugations which will define the shape of the ring-shaped elements and which will hold in position the binding hoops. A pressure is then applied to the rubber filling the cylindrical tube, of such magnitude that the wall of the tube changes its shape in conformity with that of the mould. The pressure is then reduced and the rubber is vulcanised. Finally, the spring is taken out of the mould and its second end is closed.

In the case when the hoops are constituted as is shown in Figs. 3 and 4, it is unnecessary to provide a mould intercalated between the hoops to define the shape of the ring-shaped elements constituting the corrugations, because the hoops themselves in their position of contact define this shape.

The mould then can be reduced to a cylindrical sleeve guiding axially the hoops and co-operating with their radial strength during the shaping operation, which latter takes place under a higher pressure than the working pressure.

The principal practical advantages of the arrangement according to the invention are the following ones:

(a) It is very light and its bulk is small in comparison with the various kinds of springs in current use (torsion bars, resilient blades, helical springs), owing particularly to the fact that the whole of the useful section of metal can work with a sensibly uniform fatigue.

(b) It acts as a very efficient shock absorber, as explained above.

(c) The rubber is protected by external agents that are capable of enhancing its ageing, and, if the material constituting the inside of the casing is chemically inert towards the rubber product, this latter will preserve its properties for a very long time.

(d) By using the method of manufacture described above the cost price of such a device will be very low, compared with that of a spring and of a shock absorber of the same efficiency.

What we claim is:

1. A composite spring for shock absorbing purposes comprising an entirely enclosed casing defined by a unitary side wall continuous around said casing and closure members rigidly secured to the opposite ends of said wall and completely sealing said ends, said wall being axially deformable under stress with consequent decrease of internal volume of said casing, and said casing in an unstressed condition being completely filled with rubber.

2. A composite spring as claimed in claim 1, in which only a portion of said wall is axially deformable.

3. A composite spring as claimed in claim 1, in which only the middle portion of said wall is axially deformable.

4. A process for the manufacture of a composite spring for shock absorbing purposes comprising taking a cylindrical metal tube closed at one of its ends, filling the said tube with rubber, placing the said tube so filled in a mould with corrugated sides, exerting on the tube and the rubber an axial force to shape the wall of the tube in conformity with that of the mould, vulcanising the rubber in situ after withdrawing the axial force and closing the other end of the tube.

5. A process for the manufacture of a composite spring for shock absorbing purposes comprising forming a cylindrical metal tube by winding several layers of sheet metal one over the other, closing one end of the tube so formed, filling the said tube with rubber, placing the said tube so filled in a mould with corrugated sides, exerting on the tube and the rubber an axial force to shape the wall of the tube in conformity with that of the mould, releasing the said force, vulcanising the rubber in situ and closing the other end of the tube.

6. A composite spring for shock absorbing purposes comprising an entirely enclosed casing defined by a unitary side wall continuous around said casing and closure members rigidly secured to the opposite ends of said wall and completely sealing said ends, said side wall being of a material such that said wall is deformable on subjection of the casing to compressive stress applied between said ends, said material being non-permanently deformable whereby according as said wall is temporarily deformed in response to said stress or is freed from that deformation incidental to release of said stress the internal volume of the casing is greater or less, said casing containing a mass of rubber which completely fills the casing when it is relieved of said stress and hence is of the said greater internal volume.

7. A composite spring as claimed in claim 6, in which only the middle portion of said wall is deformable.

8. A composite spring for shock absorbing purposes comprising an entirely enclosed casing axially deformable under stress with consequent decrease of internal volume, and in an unstressed condition being completely filled with rubber, said casing being circular and corrugated circularly at its middle portion so as to shorten under an axial stress, its two end-portions being smooth and non-deformable.

9. A composite spring for shock absorbing purposes comprising an entirely enclosed casing axially deformable under stress with consequent decrease of internal volume, and in an unstressed condition being completely filled with rubber, said casing being circular with its middle portion constituted by a plurality of superposed metal sheets, and being corrugated circularly at its middle portion so as to shorten under axial stress, its two end-portions being smooth and non-deformable.

10. A composite spring for shock absorbing purposes comprising an entirely enclosed casing axially deformable under stress with consequent decrease of internal volume, and in an unstressed condition being completely filled with rubber, said casing being circular and corrugated circularly at its middle portion, and external hoops disposed in the hollows of the corrugations, adapted to guide and limit the deformations of the said corrugations.

11. A composite spring for shock absorbing purposes comprising an entirely enclosed casing axially deformable under stress with consequent decrease of internal volume, and in an unstressed condition being completely filled with rubber, said casing being circular and corrugated circularly at its middle portion, and external hoops disposed in the hollow of the said corrugations and of such section that in the position of maximum deformation they are in contact with each other and fit exactly with the corrugations.

References Cited in the file of this patent

UNITED STATES PATENTS

| | | |
|---|---|---|
| 139,862 | Bridges | June 17, 1873 |
| 1,864,080 | Madge | June 21, 1932 |
| 1,879,663 | Dreyer | Sept. 27, 1932 |
| 2,148,104 | Burke | Feb. 21, 1939 |
| 2,504,393 | Cook | Apr. 18, 1950 |
| 2,572,438 | Branson | Oct. 23, 1951 |

FOREIGN PATENTS

| | | |
|---|---|---|
| 229,015 | Switzerland | Dec. 16, 1943 |
| 637,707 | Great Britain | May 24, 1950 |
| 749,942 | Germany | Dec. 8, 1944 |